Oct. 23, 1962 R. L. HUFFMAN 3,060,276

AUTOMATIC PULSE GENERATOR FOR A TELEPHONE SYSTEM

Filed July 24, 1959 2 Sheets-Sheet 1

INVENTOR.
ROBERT L. HUFFMAN

BY E. R. Sipe

ATTY.

AUTOMATIC PULSE GENERATOR FOR A TELEPHONE SYSTEM

Filed July 24, 1959 2 Sheets-Sheet 2

INVENTOR.
ROBERT L. HUFFMAN
BY C. R. Sipe
ATTY.

United States Patent Office 3,060,276

Patented Oct. 23, 1962

3,060,276

AUTOMATIC PULSE GENERATOR FOR A TELEPHONE SYSTEM

Robert L. Huffman, Michigan City, Ind., assignor to Automatic Electric Laboratories, Inc., a corporation of Delaware Filed July 24, 1959, Ser. No. 829,357
6 Claims. (Cl. 179—90)

The present invention pertains to impulse generators for use on automatic telephone systems for automatic sequential transmission of a plurality of series of impulses representing a preselected called station identification number, and particularly to an automatic high speed impulse generator which is set to transmit a series of impulses in accordance with the lineal movement of a movable contact across a selected number of stationary contacts.

The most common form of pulse generator in use today is, of course, the well known rotary dial. Multidigit generating mechanisms have, in the past, been predicated upon the basic operating principles of the rotary dial. While lineal conditioning is known, the lineal motion of the setting mechanism has been converted to rotary motion for generation of the impulses. The advantages gained by the simplicity of lineal setting is thus offset by the complexity of the converting mechanism and its attendant disadvantages such as the cost of manufacture and maintenance. Further, the complicated mechanisms are susceptible to minor misadjustments caused by use or by inexpert installation.

Pulse generating mechanisms predicated upon the principles of the rotary dial are also quite slow. With the advent of electronic switching in telephone systems, it is contemplated that a much faster pulse generating means will be desirable.

The pulse generator of the present invention utilizes a plurality of sets of stationary contacts, each peculiar to a digital position in a called number, and a plurality of movable contacts, each associated with one of the sets of stationary contacts, adapted to be moved in a straight line from a home position to a selected contact in its associated set of stationary contacts and motivated in a straight line to its home position to generate a series of regular impulses in accordance with the selected contact upon which it was positioned.

The motivating means of this invention for returning the first movable contact to its home position is actuated by the calling party, while the motivating means for the remaining movable contacts is actuated by the return of the preceding contact to its home position to assure proper sequential transmission of the pulse series representative of the digits of a called number.

It is the primary object of this invention to provide a simplified mechanism for setting up a multidigit called number which is actuated to automatically generate a plurality of series of impulses, the impulses being representative of the multidigit called number.

Another object of this invention is to provide a pulse generating means for an automatic telephone system which operates with reciprocating lineal motion.

Another object of this invention is to provide an impulse generating mechanism with separate pulse generating means for each digit in a called number.

A still further object of this invention is to provide an impulse generating means in a telephone system with means for setting up an entire multidigit number and sequentially transmitting the impulses representative of the digits in the preselected order.

These and other objects of this invention will be apparent to one skilled in the art from a reading of the following detailed description in conjunction with the drawings wherein.

Figure 6:
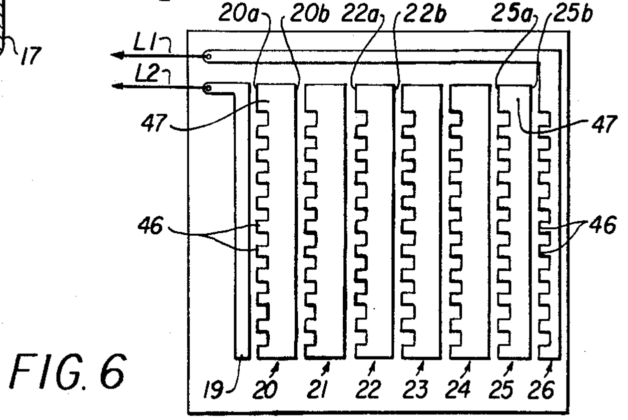
FIG. 6 is a diagrammatic representation of the stationary conductors and their electrical connections.

Referring now to the drawings, the pulse generator of this invention is assembled in an enclosure 11 comprising two sidewalls 12, two end walls 13, a slotted cover plate 14 having a plurality of slots 16 formed therein, and a base plate 17. A sheet of insulating material 18 is positioned on the base plate 17 of the assembly enclosure and has a plurality of separate conducting paths 19–26 (FIG. 6) formed thereon by printed circuit methods or otherwise bonded thereto in close regular proximity to, but electrically insulated from, each other.

Each of the conducting paths 20–25 serves a dual function and accordingly, for purposes of illustration, is shown as being comprised of two sections—the continuous contact sections **20*b*–25*b*, and the interrupted contact sections 20*a*–25*a*. The terminal conductors 19 and 26 are continuous and interrupted contact sections respectively. As will be explained in detail below, the seven digital pulsing mechanisms A, B, C, D, E, F, and G each includes a continuous section of one conductor and an interrupted section of an adjacent conductor, as, for example, the sections 24*b* and 25*a*** form the stationary contacts for the digital pulsing mechanism F.

As noted above, the dialing device of this invention comprises a plurality of digital pulse generating mechanisms, one for each digit of the number to be called. The embodiment illustrated in the drawings is adapted for transmission of a seven digit number and, accordingly, has seven digital pulse generators mounted side by side in its enclosure with the first mechanism A being manually actuated by means of a trigger lever 31 and the subsequent mechanisms, each actuated by the completion of operation of the preceding adjacent mechanism to assure proper sequential transmission of the digits. Each digital pulse generating mechanism includes a rod 32 suspended by its ends in the end plates 13 of the enclosure 11 and having a movable contact assembly 33 slideably mounted thereon with a compression spring 34 concentric therewith adapted to urge the movable contact assembly 33 towards a home position against the upper end of the slot 16. The movable contact assembly includes a block 36 having a bifurcated contact 37 and a detent spring 38 mounted on its bottom surface and a slide block 39 mounted on its top surface and engaged with the slot 16 in the cover plate 14 of the enclosure 11. The slide block 39 has an indicator plate 41 secured on its upper surface by means of which the entire contact assembly can be moved to a position designated by the indicating arrow on the indicating plate being aligned with the stationary numbers on the cover plate 14. A detent rack 42 having ten detent grooves 43 therein, corresponding to the ten positions designated on the cover plate 14, is fixedly mounted in the enclosure 11 between the stationary contacts on the surface 18 and the movable contact assembly 33 on the rod 32. The detent rack 42 has associated therewith a slideably mounted stripping bar 44 having grooves 45 corresponding to the grooves 43 in the detent rack and a blocking projection **44*a* which normally holds the stripping bar in position with its grooves aligned with those of the detent bar 42 under control of an associated blocking projection 31*a* on the trigger bar 31. The projection 44*a* on the stripping bar 44** also serves, when unblocked, as a point at which force can be applied to move the stripping bar to its operated position.

Figure 2:
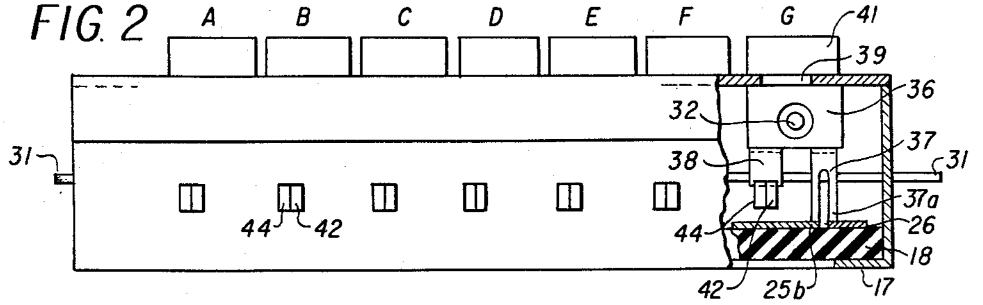
FIG. 2 is a front elevation with portions of the front surface broken away.
Figure 3:
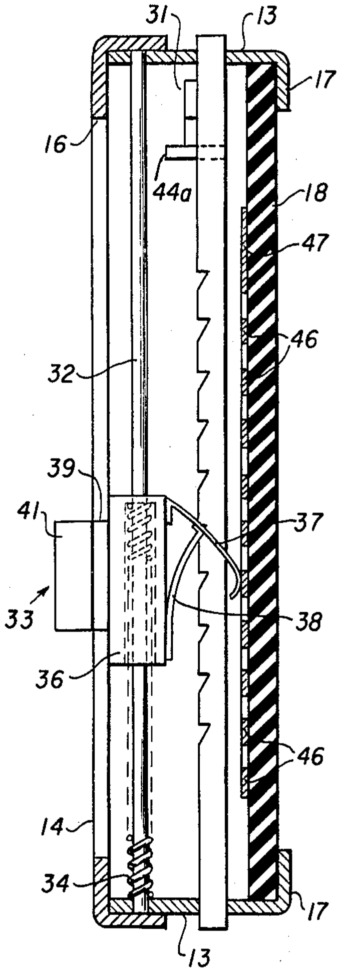
FIG. 3 is a right section taken along the line 3—3 of FIG. 1.

As is best seen in FIGS. 2 and 3, the detent spring 38 on the mobile contact assembly 33 is adapted to engage the aligned grooves 45 and 43 in the stripping bar and the detent rack respectively to hold the mobile contact assembly against motivation by the compression spring 34 back to its home position so long as the stripping bar 44 is in an unoperated position. The bifurcated contact 37 on the mobile contact assembly 33 is positioned to be engaged with one of the separate regular contacts 46 on an interrupted contact section and the adjacent continuous lineal stationary contact section when it is not in its home position. When it is in its home position, one of the legs of the bifurcated contact 37 is engaged with a major contact 47 on the interrupted contact section while the other leg is engaged with the adjacent continuous contact section. It will thus be seen that all of the stationary contact strips are serially connected to two sides of the telephone line through the movable contact so long as the movable contacts are in any one of the ten digital positions or the home position and that movement of the movable contact across the interrupted contact section will create a series of uniform opened and closed periods in the loop circuit.

All of the digital impulse mechanisms are substantially identical with the exception of the first mechanism which has a spring 48 attached to its stripping bar 44′ and suitably anchored in the enclosure 11 to constantly urge the stripping bar to its operated position. Operation of the initial stripping bar 44′ is prevented by the blocking of the projection **31*a′* on the trigger bar 31 which is normally held in a blocking position by a spring 49. The blocking projection 31*a′* of the trigger bar 31 is also positioned to close the shunt springs in a spring pile-up 51 which is positioned on the wall 12 of the enclosure 11** adjacent to the initial digital impulse mechanism A.

Figure 4:
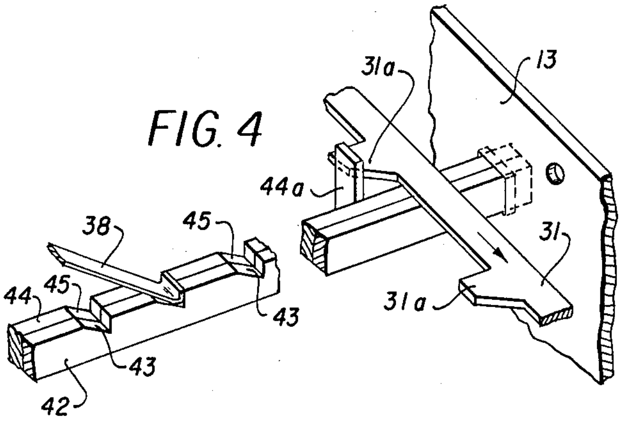
FIG. 4 is an enlarged perspective of the detent and stripping mechanism with the stripping mechanism in an unoperative position.
Figure 5:
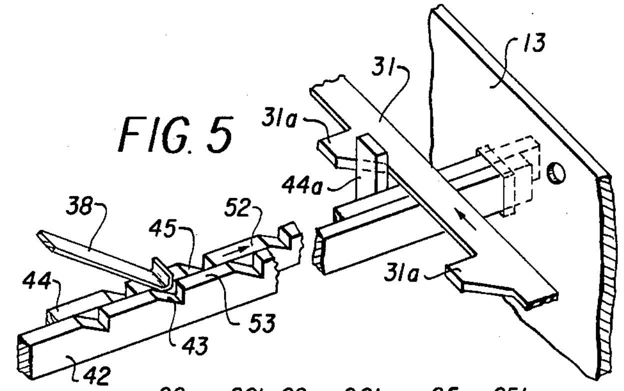
FIG. 5 is an enlarged perspective of FIG. 4 with the stripping bar in an operated position.

Referring specifically to FIGS. 4 and 5, the detent spring 38 of a mobile contact assembly is positioned in a selected detent groove formed by the cooperation of the grooves 43 of the detent rack and 45 of the stripping bar in its unoperated position. The stationary grooves 43 in the detent rack 42 correspond to the ten digital positions of each digital impulse mechanism. When the movable contact assembly is manually positioned, it is retained in that position against the motivating force of its compression spring 34 by cooperation of the detent rack 42 with the detent spring 38 of the assembly. Upon the movement of the trigger bar 31 to permit operation of the stripping bar 44 either by the spring 48 on the initial mechanism or by the return of the preceding mobile contact assembly to its home position as is the case for the subsequent digital impulse mechanisms, the detent spring 38 is moved out of the holding grooves and moves across the smooth path provided by the shoulders 52 of the stripping bar and 53 of the detent rack to its home position. The movement of the movable contact assembly to its home position moves one leg of the bifurcated contact 37 across the associated interrupted contact section and the other leg across the continuous lineal section, thereby opening the series circuit formed by connection of the conducting plates in accordance with the selected lineal position of the mobile contact assembly.

For a better understanding of the operation of the pulse transmitter, assume that the number FIllmore 5–9431 is to be transmitted. Before seizing a telephone line by closing the hookswitch on the handset, the calling party positions the mobile contact assemblies in accordance with the number to be called. The mobile contact assembly of initial impulse mechanism A is moved down to the F, or third, position as indicated by the indicator plate 41 and the position chart on the cover plate 14, and the mobile contact assembly of the second mechanism B is similarly positioned at I or the fourth level. The mobile contact assemblies of the remaining mechanisms C, D, E, F, and G are similarly positioned in accordance with the digit to be transmitted by each. With the mobile contact assemblies thus positioned, the conductor plates are connected in series by the two legs of the contact. The contact of the initial mechanism A is engaged with the third minor contact projection on the interrupted contact section **20*a*** so that movement back to its home position moves it across three open spaces thus interrupting the series circuit three times. All of the contacts of the subsequent movable contact assemblies are similarly engaged.

Figure 1:
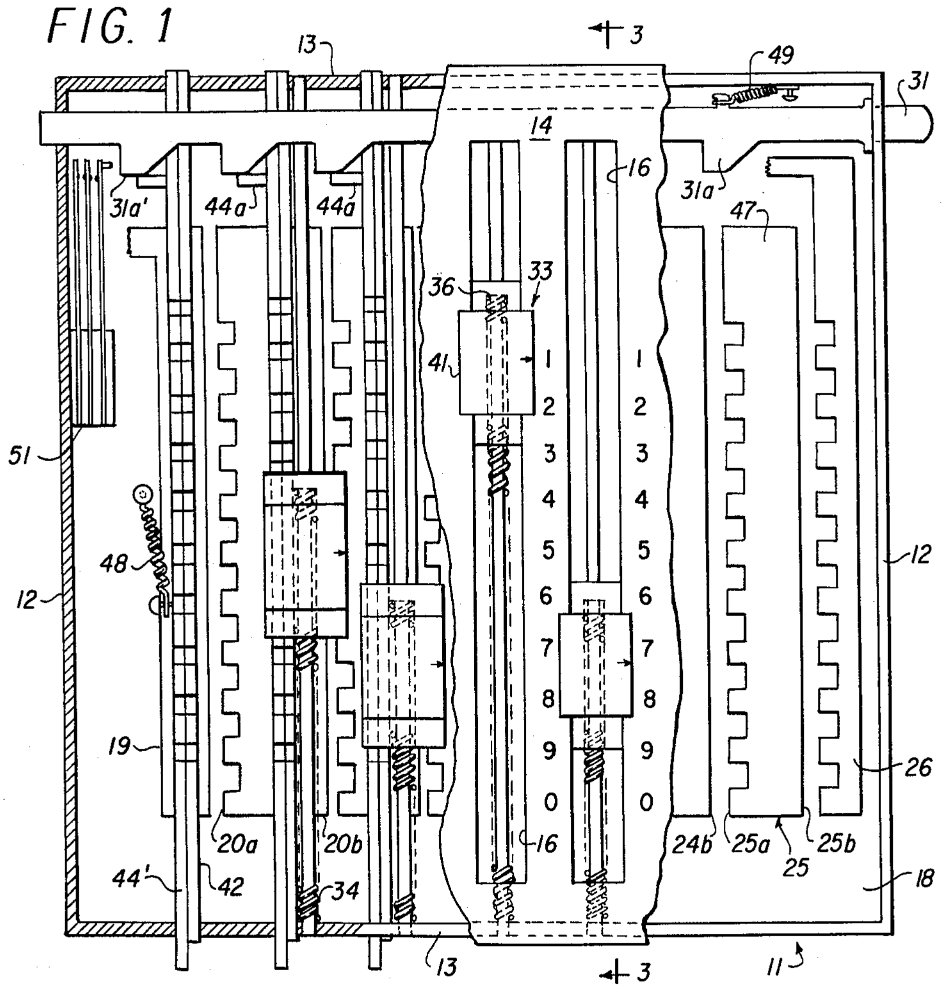
FIG. 1 is a top plan view of the pulse generator with portions of the top surface broken away.

Having thus positioned the mobile contact assemblies, the calling party picks up his telephone and completes a loop circuit which includes the serially connected conductor plates. The calling party then moves the trigger bar 31 to the left (FIG. 1) to unblock all of the operating bars 44 and to close the shunt springs on the spring pile-up 51. Upon removal of the blocking projection **31*a′* by movement of the trigger bar 31, the operating bar 44′ of the initial digital impulse mechanism A, and only that operating bar, is moved to an operated position by its spring 48 and the detent spring is moved out of its holding groove to permit motivation of the mobile contact assembly to its home position by the associated motivating spring 34. During the return of the mobile contact assembly of the initial mechanism A to its home position, the pulsing contact leg 37*a* of the contact spring 37 moves across three open spaces and two minor contacts 46 to a major contact 47 thereby interrupting the loop circuit for three regular periods separated by two regular closed periods and terminated by a closed period of longer duration than the regular closed period. The terminating closed period is attendant upon the contact moving across the major stationary contact 47. The return of the mobile contact assembly 33 to its home position brings it into contact with the projection 44*a* of the stripping bar 44 of the next adjacent mechanism to move it to its operated position and thereby permit movement of the subsequent contact assembly to its home position to similarly transmit pulses to the telephone line and actuate the next adjacent digital pulse mechanism. This operation is repeated until all of the mobile contact assemblies are moved back to their home positions at which time the trigger bar 31 is either released by the calling part or unlatched by the return of the last mechanism G to its home position and permitted to return to its blocking position. Return of the trigger bar 31 to its home position moves all of the stripping bars 44** to an unoperated position preparatory to subsequent operation on the next call.

While the present invention is illustrated in a particular embodiment, it is, of course, understood that changes may be made therein without departing from the spirit and scope of the invention as defined in the appended claims.

What is claimed is:

1. In an automatic telephone system, a pulse generating device comprising: a unitary stationary contact electrically connected to one conductor of the telephone system; a plurality of separate, uniform, regularly spaced stationary contacts positioned adjacent to and insulated from the unitary contact, said contacts being commonly connected to another conductor of the telephone system; mobile contact means movable in a linear movement to successively connect the unitary stationary contact with each of the separate stationary contacts; means for selectively positioning said mobile contact means along its locus away from a home position in engagement with one of said separate contacts; and means operated to return said mobile contact means along its normal locus to its home position whereby the electrical connection between the two conductors is opened and closed by the successive connection on said unitary contact with its associated spaced contacts to generate a series of impulses in accordance with the selected position of the mobile contact.

2. In an automatic telephone system, means for translating a multidigit telephone number into a plurality of series of impulses comprising: a plurality of regularly spaced lineal guide means; a plurality of blocks slideably mounted one on each of said guide means; motivating means for urging said blocks toward a home position on said guide means; a plurality of racks, one positioned subjacent each guide means; a plurality of detents one fixed at one end on each of said blocks for engagement with one of said racks for maintaining said blocks in a selected position against the urging of said motivating means; a plurality of stripping bars juxtaposed one with each rack for operation to render said detents ineffective; a trigger bar having a plurality of projections, one in blocking engagement with each of said stripping bars for holding said bar unoperated; an operating spring constantly urging the first of said stripping bars to an operated position; means controlled by the return of each block to its home position to move the succeeding stripping bar to its operated position; and means operated by the travel of said block for generating a series of impulses in accordance with its selected position, whereby the movement of said trigger bar permits the movement of the first of said blocks to its home position to cause the sequential return of all of the blocks to their home position to sequentially generate a plurality of series of impulses.

3. In an automatic telephone system, means for transmitting a multidigit number to a telephone line comprising: a plurality of digital impulse mechanisms each including a series of stationary contacts and a single contact member spaced adjacent said series of contacts, mobile contact means including a bridging member for each mechanism, and motivating means operated to move each of the mobile contact means a selected distance across the associated stationary contact means to transmit a series of impulses to the telephone line by successively connecting certain of the associated stationary contacts with said single contact member by said bridging member in accordance with the distance traveled; a trigger bar; means associated with each digital impulse mechanism to actuate its associated motivating means; means controlled by said trigger bar to operate only one of said actuating means; and means controlled by the completion of travel of each mobile contact means to operate the actuating means of its adjacent digital impulse mechanism whereby the sequential motivation of the digital impulse mechanisms is initiated by operation of the trigger bar to sequentially transmit a plurality of series of impulses to the telephone line in accordance with the preselected positioning of the mobile contact means.

4. In an automatic telephone system, means for translating a multidigit telephone number into a plurality of series of impulses comprising: a plurality of digital pulse generating mechanism; positioning means for individually positioning each digital pulse generating mechanism in accordance with a digit to be translated; manually actuated means for sequentially operating said digital pulse generating mechanisms; and pulsing means conditioned by the positioning of each digital pulse generating mechanism and controlled by their operation, said pulsing means including in each digital pulse generating mechanism a lineal continuous contact, ten regular contacts lineally positioned adjacent to and coplanar with each of said continuous contacts, mobile contact means adapted to connect successive ones of said individual contacts with said continuous contact and means for moving each said mobile contact means in a lineal path from its selected position to its home position to thereby successively connect certain of its regular contacts with their associated linear contact, whereby a circuit is alternately opened and closed in accordance with the number of individual contacts across which the mobile contact means moves to generate a series of impulses.

5. In an automatic telephone system, means for translating a multidigit telephone number into a plurality of series of impulses comprising: stationary contact means having a lineal continuous contact and a plurality of lineally aligned separate contacts adjacent to and coplanar with the continuous contact; a mobile contact assembly associated with said stationary contact means, said mobile contact assembly including a block slideably mounted for lineal movement parallel to both said continuous contact and said individual contacts, a spring loaded by movement of said block away from a home position, operable to return said block to its home position, and a contact spring carried by said block constantly engaged with said continuous contact and successively engageable with each of said separate contacts to complete a circuit with each successive engagement; positioning means for holding said mobile contact assembly in a selected position against the urging of its loading spring; means operated to render said positioning means ineffective and permit the return of said mobile contact assembly to its home position; and pulsing means operated by each completion of a circuit between said continuous contact and said separate contacts to generate a series of pulses in accordance with the number of separate stationary contacts across which the mobile contact assembly moves.

6. In an automatic telephone system, means for translating a multidigit telephone number to impulses for operating a switchtrain in the telephone system comprising: a first digital impulse generating mechanism; a plurality of second juxtapositioned pulse generating mechanisms adjacent to and substantially parallel with said first digital pulse generating mechanism, each of said digital pulse generating mechanisms having a continuous lineal stationary contact, a plurality of separate lineally positioned stationary contacts coplanar with and adjacent to said continuous contact, a mobile contact in constant engagement with said continuous contact and movable in a straight line from a home position for sequential engagement with each of said separate contacts, moving means normally urging said mobile contact toward its home position, detent means whereby said moving means is rendered ineffective and said mobile contact is positioned in a selected position along its locus, and stripping means associated with said detent means for actuating said moving means; a slideably mounted trigger bar having a plurality of projections thereon one positioned relative to each of said stripping mechanisms to prevent operation thereof; constantly engaged means for moving the stripping bar of said first digital pulse generator to an operated position; means operated by the return of the mobile contact of said first digital pulse generating mechanism to its home position to move the stripping means of one pulse generating mechanism out of said plurality to an operated position; means operated by the return of the mobile contact of each of said plurality of second pulse generating mechanisms to a home position for operating the subsequent adjacent pulse generating mechanism; and pulsing means operated by the movement of each of said mobile contacts to their home positions for generating a plurality of series of impulses in accordance with the selected positioning of the mobile contacts whereby the mobile contacts of each of said digital pulse mechanisms is placed in a selected position representative of a digit in a telephone number for sequential generation of a plurality of series of pulses upon movement of said trigger bar to a non-blocking position.

References Cited in the file of this patent

UNITED STATES PATENTS

| | | |
|---|---|---|
| 1,037,172 | Clement | Aug. 27, 1912 |
| 1,478,419 | Bailey | Dec. 25, 1923 |
| 2,032,229 | Servanton et al. | Feb. 25, 1936 |
| 2,191,913 | Lewis | Feb. 27, 1940 |